(12) United States Patent
Herb et al.

(10) Patent No.: US 6,461,091 B2
(45) Date of Patent: Oct. 8, 2002

(54) CONNECTION ELEMENT

(75) Inventors: Armin Herb, Apfeldorf; Fritz Hermann, Landsberg; Ulrich Birnbaum, Kaufering; Marcus Fohrer, Hergensweiler, all of (DE); Gordillo Antonio Lopez, Vedat-Torrent (ES)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/817,505

(22) Filed: Mar. 26, 2001

(65) Prior Publication Data

US 2001/0055521 A1 Dec. 27, 2001

(30) Foreign Application Priority Data

Mar. 3, 2000 (DE) .......................................... 100 10 643

(51) Int. Cl.$^7$ ............................ F16B 19/00; F16B 21/00
(52) U.S. Cl. ..................... 411/339; 411/353; 411/354; 411/512; 285/318
(58) Field of Search ................................. 411/338, 339, 411/352, 353, 354, 512; 285/318

(56) References Cited

U.S. PATENT DOCUMENTS

| 2,503,093 | A | * | 4/1950 | Buchanan | .................... 285/318 |
| 2,848,135 | A | * | 8/1958 | Rickard | .................. 285/318 X |
| 4,802,700 | A | * | 2/1989 | Stevenson et al. | ...... 411/353 X |
| 5,073,071 | A | * | 12/1991 | Herwig et al. | .............. 411/353 |
| 5,098,241 | A | * | 3/1992 | Aldridge et al. | ......... 411/353 X |

* cited by examiner

Primary Examiner—Neill Wilson
(74) Attorney, Agent, or Firm—Sidley Austin Brown & Wood, LLP

(57) ABSTRACT

A connection element for a bolt including a member for receiving the bolt (2) and including a bore (5) having a tapering region (7) adjoining a bore cylindrical receiving region (4) and tapering in a direction opposite a bolt insertion in direction (A); and a locking member supported in the bore (5) for forcelockingly engaging the bolt (2) and formed as a radially expandable annular member having an inner diameter (w), which is, at least partially, smaller than an outer diameter (d2) of the bolt (2), and an axial length corresponding to an axial length of the cylindrical receiving region (4).

3 Claims, 1 Drawing Sheet

CONNECTION ELEMENT

BACKGROUND OF THE INVENTION

1. Field of the Invention

The present invention relates to a connection element having a bolt receiving member having a bore in which there is located at least one locking member that forcelockingly engages the bolt for retaining the same.

2. Description of the Prior Art

One of the most often used methods of connection of two or more parts is the connection with a bolt. To this end, a bolt, which is provided with an appropriate outer profile, is connected with a nut having a corresponding inner profile cooperating with the outer profile of the bolt. According to another method, for bolts without an outer thread, a clamp connection is used. According to this method, a connection element, which is connected with a bolt, is provided with a bore in which a clamping or locking element is located. Preferably, such connection elements are used for connection with bolts having an outer profile different from a threaded profile. The connectable parts can be connected with the bolt or the connection element, or both. Often, a bolt forms an integral part of a connectable part. In this case, the other of the connectable parts is provided with a bore through which the bolt extends. After the connection of two parts, the connection element is pressed on the projecting portion of the bolt. The connection element can also be formed as an integral part of one of the connectable parts. In this case, the bolt is screwed into the connection element which is usually located in the bore of a corresponding connectable part. The bolt can be formed, e.g., as a threaded rod connectable with a pipe retainer.

A common drawback of the known connection means is a generally long screw-in path which has to be overcome in order to obtain a required fixed connection between a stud or a threaded rod and a nut element. In order for the nut to be simply and reliably screwed onto the outer thread of a stud or a threaded rod, the run-on portion of the thread should be free from any damage. The run-on portion can be damaged, e.g., when a threaded rod is cut to a desired length. In order to provide for an easy run-on, the threaded rod need be subjected to a subsequent treatment.

The prior art discloses two methods which can be interpreted as based on the use of connection elements. However, they do not meet the requirements of the fire protection ordinances and, moreover, on many occasions, cannot withstand the required load applied thereto. E.g., known are, from the sanitary technology, plastic nuts which are pushed over threaded rods in an inclined condition and became fastened after being tilted back. These nuts are difficult in handling and, because of their combustibility, are not suitable for fire safety-relevant applications. The nuts of fire-resistant materials such as, e.g., aluminum or sheet metal mostly lack quick-connection properties and, besides, being made of a thin, sheet material cannot withstand the necessary load applied thereto.

Accordingly, and object of the present invention is a connection element for a bolt connection and which can provide a reliable connection under high loads applied thereto.

A further object of the invention is to provide a connection element which can be economically produced and is easy to handle.

SUMMARY OF THE INVENTION

These and other objects of the present invention which will become apparent hereinafter, are achieved by providing a connection element having a bolt receiving member with a bore having a cylindrical receiving region and a tapering region adjoining the cylindrical receiving region and tapering in a direction opposite a bolt insertion direction. There is further provided a locking member supported in the bore of the receiving member for forcelockingly engaging the bolt and formed as a radially expandable annular member having an inner diameter which is, at least partially, smaller than an outer diameter of the bolt, and an axial length corresponding to an axial length of the cylindrical receiving region of the receiving member.

With a radially expandable annular member, the bolt can be quickly displaced in the insertion direction by being simply pushed through the annular member. The leading end of the bolt simply expands radially the annular member which is located in the cylindrical receiving region of the bolt receiving member. Upon application of a tensile lead, the annular member is pushed into the tapering region of the bore, which adjoins the cylindrical region. This prevents further radial expansion of the annular member. As a result, a forcelocking or frictionlocking connection is formed between the annular member and the outer surface of the bolt. The force, with which the annular member is connected with the bolt, can be easily adjusted by pushing the bolt through the annular member to a greater or lesser extent. When the bolt has a corresponding outer profile both forcelocking and frictionlocking connections are formed as the annular member, at least partially, engages the outer profile of the bolt. The release of the connection can be effected by pulling the bolt out of the connection element. When a threaded rod is used for connection purposes, the finishing treatment of the rod, the run-on portion of which is damaged, e.g., as a result of cutting the rod to length, e.g., burr removal, is not necessary as the formed connection is not a threaded connection. The annular member can be used for locking in place a bolt the outer surface of which has almost any imaginable profile having a somewhat circular shape or is provided with thread-shaped indentations.

Advantageously, the annular member is formed as a spring. During the insertion of a bolt, the spring becomes partially elastically deformed, facilitating thereby the insertion of the bolt. The pressure applied to the bolt upon its insertion causes a small buckling of the spring in the insertion direction of the bolt, providing thereby radial place for the spring to expand radially. The spring, in this case, snaps over the outer surface of the bolt or over the shaped profile of the bolt, in case the bolt has one. This snapping results in a radial load force applied to the bolt, which insures a reliable locking of the bolt.

Preferably, in its release condition, the spring has an axial length that exceeds the axial length of the cylindrical receiving region of the receiving member. This insures a continuous engagement of the spring with the bolt. If a tensile load is applied to the connection, the spring already contact the bore surface, which defines the tapering region, preventing displacement of the bolt relative to the receiving member. In addition, such preload of the spring provides for locking of the spring in the receiving region of the bore of the receiving member.

Preferably, the spring is formed as a truncated cone-shaped helical spring, which insures an optimal engagement of the spring with the bolt. Such shape of the spring prevents the spring from rotation in the cylindrical receiving region of the bore of the receiving member. Advantageously, the spring contacts the wall of this region of the bore. The rotation of the spring is prevented by the friction between the spring and the bore wall in this region. The portion of the spring located in the tapering region of the bore has a smaller diameter, whereby the spring can radially expand upon being compressed upon the insertion of the bolt.

Preferably, the spring is formed of a spring steel or other material having at least a similar elastic modulus. The use of highly elastic materials, in particular of the spring steel, insures a reliable functioning of the connection element. Upon insertion of a bolt, both radial and axial forces are applied to the spring. For a reliable connection, it is important that the spring has a sufficiently high elasticity so that it engages the outer surface of the bolt or a shaped outer profile of the bolt, in case the bolt has the latter, with a sufficient force.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
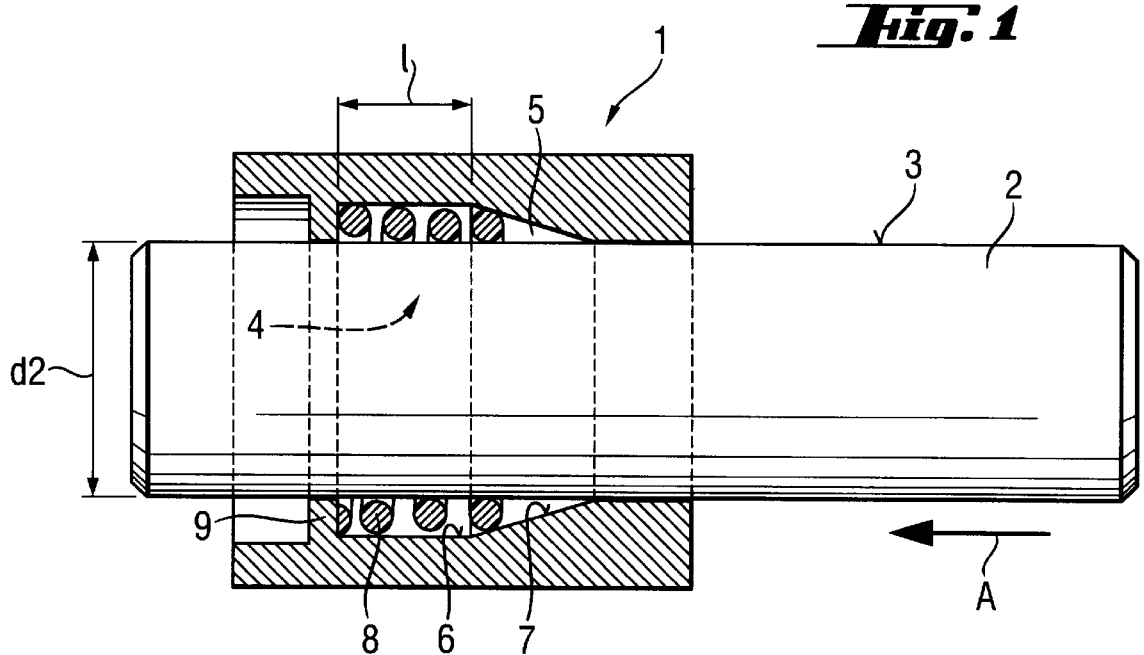
FIG. 1 a cross-sectional view of a connection element according to the present invention with a bolt extending therethrough.
Figure 2:
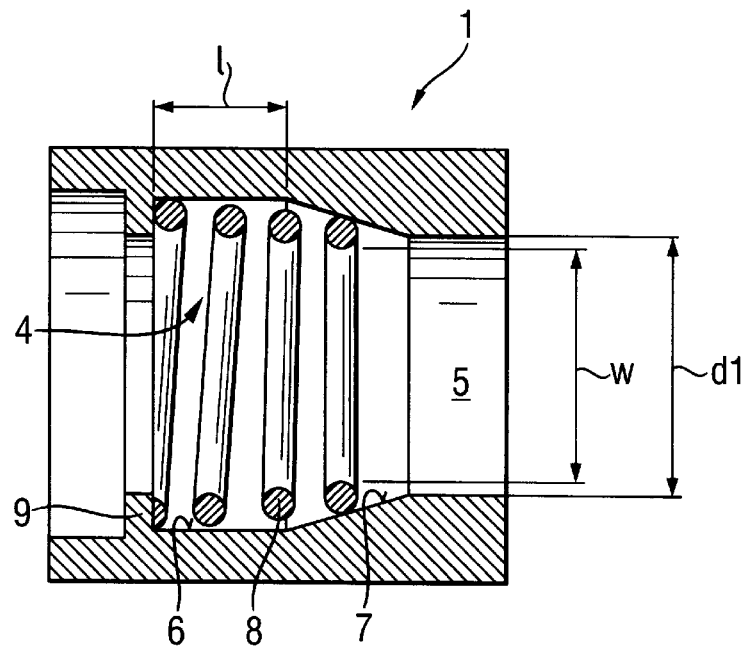
FIG. 2 a cross-sectional view of the connection element shown in FIG. 1 without a bolt extending therethrough.

A connection element according to the present invention, which is shown in FIGS. 1–2, includes a receiving member 1, and a locking member, which is formed as an annular member and is located in a receiving region 4 of the receiving member 1. The receiving member 1 can be formed as a separate part and can be formed, e.g., as a nut. The receiving member 1 can also be formed as a component of an attachment member, e.g., of a tubular clip for receiving a threaded rod.

A bore 5 of the receiving member 1 has a region 7 which adjoins the cylindrical receiving region 4 of the receiving member 1 and which tapers in a direction opposite the insertion direction A of a bolt 2. The tapering region 7 has its smallest diameter d1 greater than the outer diameter of the bolt 2.

The annular locking member is formed as a radially expandable, truncated cone-shaped helical spring 8 which is supported, at its end facing in the bolt receiving direction A, against an annular stop shoulder 9. At its end facing in the direction opposite the bolt receiving direction A, the spring 8 is supported against the conical surface forming the tapering region 7 of the bore 5 of the receiving member 1. The spring 8 is formed preferably of a spring steel and has, in its unloaded condition, a length which is greater than the length of the cylindrical receiving region 4 of the receiving member 1. The outer diameter of the spring 8 at its end facing in the bolt insertion direction A is so dimensioned that the spring 8 contacts the wall 6 of the bore 5. At its opposite end, the inner diameter w of the spring 8 is smaller than the outer diameter d2 of the bolt 2.

Upon insertion of the bolt 2 in the bore 5 of the receiving member 1, the length of the helical spring 8 is reduced, with the cylindrical receiving region 4 providing space for radial expansion of the spring 8. The loading of the spring 8, which is caused by the insertion of the bolt 2, results in snapping of the bolt 2 by the spring 8, with the spring 8 displacing, in a radially preloaded condition, in the direction opposite the balt insertion direction A. The spring 8 is pressed, under a tensile load, in the direction opposite the bolt insertion direction A, against the tapering region 7, whereby its radial expansion and oversnapping is prevented.

The spring 8 applies pressure to the surface of the bolt 2 independent of the shape of the bolt surface, providing a forcelocking connection between the bolt 2 and the receiving member 1.

Upon assembly of the connection element, the spring 8 is inserted into the bore 5 of the receiving member 1 from the end of the receiving member 1 remote from the receiving end of the receiving member 1 facing in the direction opposite to the bolt insertion direction A when the stop shoulder 9 has not yet been formed. With the spring 8 having been inserted into the bore 5, the receiving member 1 is upset at its end remote from the receiving end, whereby a stop shoulder 9 is formed. Upon the formation of the stop shoulder 9, the spring 8 is supported at its opposite ends against the stop should 9 and the wall forming the tapering region 7, respectively.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A connection element for a bolt, comprising a member (1) for receiving the bolt (2) and including a bore (5) having a cylindrical receiving region (4) and a tapering region (7) adjoining the cylindrical receiving region (4) and tapering in a direction opposite a bolt insertion in direction (A); and a locking member supported in the bore (5) of the receiving member (1) for forcelockingly engaging the bolt (2) and formed as a radially expandable annular member having an inner diameter (w), which is smaller than an outer diameter (d2) of the bolt (2), and an axial length corresponding to an axial length of the cylindrical receiving region (4) of the receiving member (1), wherein the annular locking member is formed as a truncated cone-shaped helical spring.

2. A connection element according to claim 1, wherein the truncated cone-shaped helical spring is formed of a spring steel.

3. A connection element according to claim 1, wherein the truncated cone-shaped helical spring has, in an unloaded condition, an axial length exceeding the axial length of the cylindrical receiving region (4).

* * * * *